(12) United States Patent
Schnurr

(10) Patent No.: US 7,164,937 B2
(45) Date of Patent: Jan. 16, 2007

(54) SYSTEM AND METHOD FOR REDUCING THE SIZE OF AN ELECTRONIC MESSAGE ON A MOBILE COMMUNICATION DEVICE

(75) Inventor: Jeffrey R. Schnurr, Waterloo (CA)

(73) Assignee: Research In Motion Limited, Waterloo (CA)

( * ) Notice: Subject to any disclaimer, the term of this patent is extended or adjusted under 35 U.S.C. 154(b) by 260 days.

(21) Appl. No.: 10/700,979

(22) Filed: Nov. 4, 2003

(65) Prior Publication Data

US 2005/0096093 A1    May 5, 2005

(51) Int. Cl.
*H04M 1/00* (2006.01)
*H04M 1/38* (2006.01)

(52) U.S. Cl. ............ 455/566; 455/414.4; 455/414.1; 709/206; 709/207; 345/581; 345/594

(58) Field of Classification Search ........... 455/414, 455/566, 414.1, 414.4; 709/206, 207; 345/581; 345/594
See application file for complete search history.

(56) References Cited

U.S. PATENT DOCUMENTS 6,195,686 B1    2/2001    Moon et al.
6,938,073 B1 *  8/2005    Mendhekar et al. ........ 709/217
2002/0138633 A1 * 9/2002  Angwin et al. ............. 709/229
2002/0147798 A1 * 10/2002 Huang ........................ 709/220
2004/0204202 A1 * 10/2004 Shimamura et al. ..... 455/575.1
2005/0066021 A1 * 3/2005  Megley ....................... 709/223
2005/0188043 A1 * 8/2005  Cortright et al. .......... 709/206

FOREIGN PATENT DOCUMENTS

EP    1 244 260 A2    9/2002

OTHER PUBLICATIONS

Christina Veveris: "Introducing Netscape Communicator" 'Online! Jan. 2000, XP002277562. Retrieved from the Internet: URL:http://jec.unm.edu/help/images/introducing_netscape.pdf>'retrieved on Apr. 21, 2004. p. 17.
EPO Search Report, App. No. 03025369.4-1246 (May 10, 2004).

* cited by examiner

*Primary Examiner*—Lester G. Kincaid
*Assistant Examiner*—Dung Lam
(74) *Attorney, Agent, or Firm*—Jones Day; Krishna K. Pathiyal; Robert C. Liang

(57) ABSTRACT

Systems and methods are provided for reducing the size of an electronic message on a mobile communication device. The mobile communication device may identify address card information in a received electronic message. The mobile communication device may then automatically display a reduced version of the electronic message on the mobile communication device, wherein the address card information is represented by an address card indicia.

22 Claims, 6 Drawing Sheets

SYSTEM AND METHOD FOR REDUCING THE SIZE OF AN ELECTRONIC MESSAGE ON A MOBILE COMMUNICATION DEVICE

FIELD

The technology described in this patent document relates generally to the field of electronic messaging systems and devices. More particularly, the patent document describes a system and method for reducing the size of a displayed electronic message. The system and method described herein is particularly well-suited for use with a mobile communication device, such as a cellular telephone, a two-way paging device, a personal digital assistant (PDA) or others.

BACKGROUND AND SUMMARY

Typical electronic mail programs enable a user to automatically append address card information to outgoing electronic messages. For instance, address card information may be included in an electronic message to identify the name, address, telephone number, email address, and/or other information pertaining to the person sending the electronic message. Typical mobile communication devices, however, are usually equipped with a small display area, relative to a full-sized desktop or laptop computer. Address card information appended to an electronic message that is received by a mobile communication device may thus take up a large portion of the device's display area.

Systems and methods are provided for reducing the size of an electronic message on a mobile communication device. A communication subsystem may be operable to send and receive electronic messages over a communication network. A memory subsystem may be operable to store data and program information. A processing subsystem may be operable to store and retrieve data in the memory subsystem, execute programs stored in the memory subsystem, and cause the communication subsystem to transmit and receive electronic messages over the communication network. A user interface may be operable to display information. An electronic messaging software application may be stored in the memory subsystem. When executed by the processing subsystem, the electronic messaging software application may be operable to receive an electronic message via the communication subsystem, identify address card information in the electronic message, and automatically display a reduced version of the electronic message on the user interface, wherein the address card information is represented by an address card indicia in the reduced version of the electronic message.

The mobile communication device may be operable to receive a first electronic message from a sender, and select a portion of the first electronic message that is likely to be repeated in subsequent electronic messages from the sender. The mobile communication device may then receive a second electronic message with the mobile communication device from the sender, and determine if the first electronic message and the second electronic message include a common subject field. If the first electronic message and the second electronic message do not include a common subject field, then the mobile communication device may compare the selected portion of the first electronic message with the second electronic message to identify repeated information. The mobile communication device may then display a reduced version of the second electronic message, wherein the repeated information is represented by an indicia.

DETAILED DESCRIPTION

Figure 1:
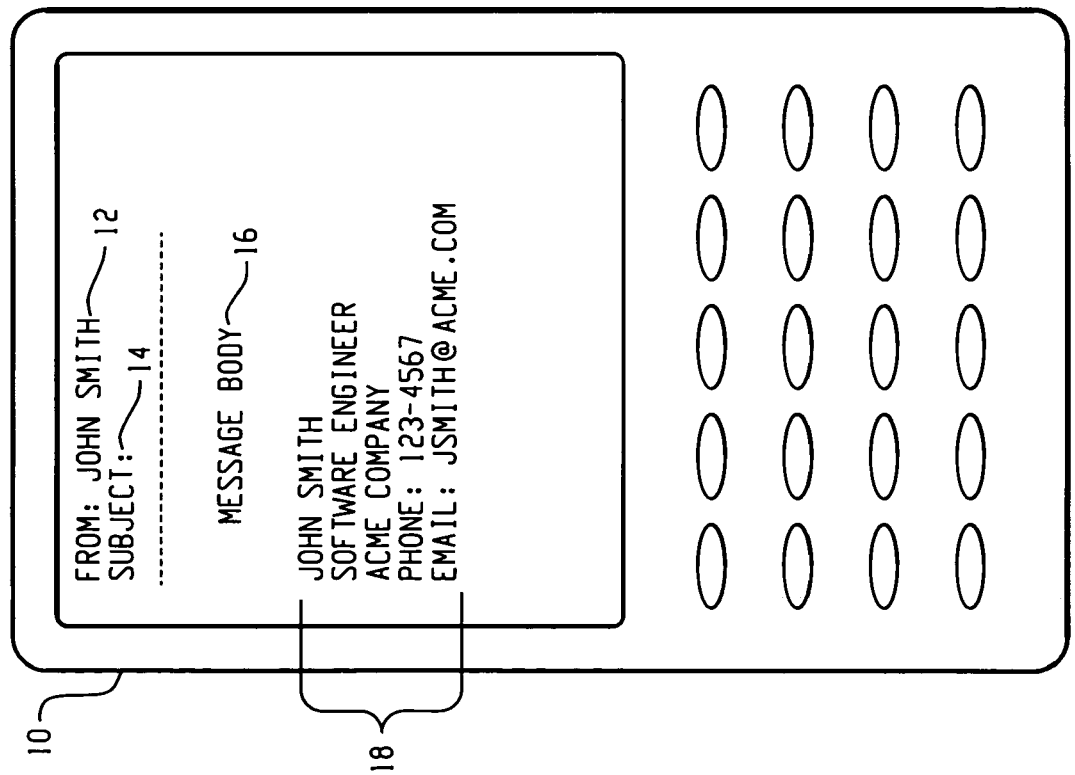
FIG. 1 shows a typical electronic message displayed on a mobile communication device.

With reference now to the drawing figures, FIG. 1 shows a typical electronic message displayed on a mobile communication device 10. The electronic message includes a sender field 12, a subject field 14, a message body 16 and address card information 18. Other fields and/or other information could also be displayed, such as a recipient field (i.e., a "To:" field), a copy field (i.e., a "cc:" field), or others. The electronic message may, for example, be received on the mobile communication device 10 using a wireless messaging service, and displayed on the device using electronic messaging software, as described below with reference to the example mobile communication device 400 shown in FIG. 7.

Figure 2:
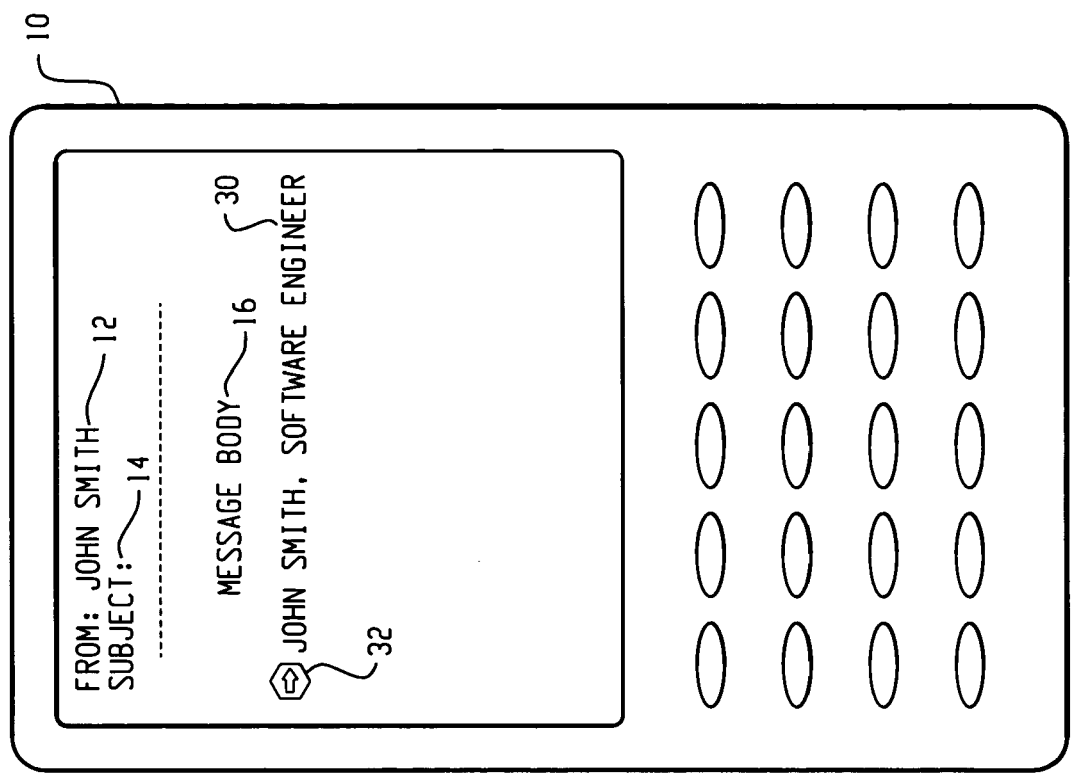
FIG. 2 shows a mobile communication device displaying an electronic message in which address card information is represented by an address card indicia.

FIG. 2 shows a mobile communication device 10 displaying an electronic message in which the address card information 18 is represented by an address card indicia 30, 32. That is, instead of displaying the complete block of address card information 18, as illustrated in FIG. 1, an address card indicia 30 is displayed to notify the device user that the received message includes the address card information 18. In the illustrated example, the address card indicia includes a graphical icon 32 and a text string 30 showing a portion of the address card information 18. It should be understood, however, that other address card indicia could also be used. For example, only the graphic icon 32 or the text string 30 could be displayed as the address card indicia, or some other type of indicia could be used.

Figure 3:
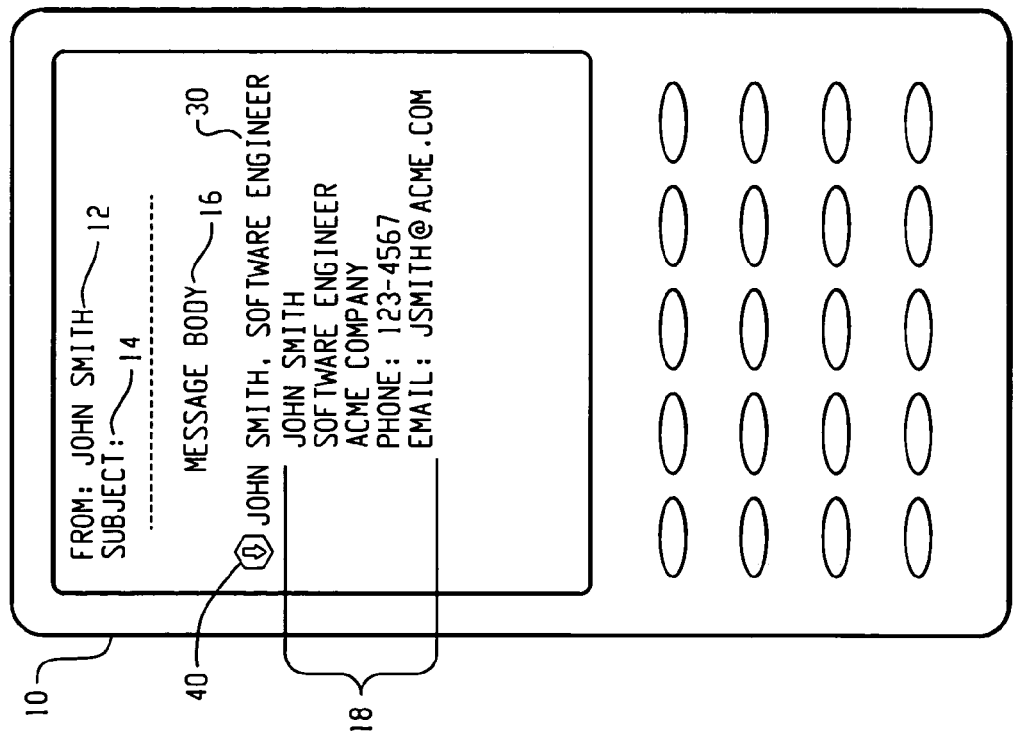
FIG. 3 shows a mobile communication device displaying an electronic message in which the address card indicia has been selected to display the represented address card information.

In operation, when an electronic message is received by the mobile communication device 10, the device identifies the address card information 18 in the electronic message. When the electronic message is viewed, the address card indicia 30 is displayed instead of the identified address card information 18 to conserve space on the display area. The address card indicia 30 may then be selected through the user interface to display the complete address card information 18, as shown in FIG. 3. In addition, when the address card indicia 30 is selected, a different graphical icon 40 may be displayed to indicate that the address card information 18 is displayed. For instance, in the example of FIG. 2, the address card indicia includes an icon 32 with an inwardly-pointing arrow. When the address card indicia is selected, as shown in the example of FIG. 3, the address card indicia includes an icon 40 with a downwardly-pointing arrow to indicate that the address card information 18 is displayed.

Figure 4:
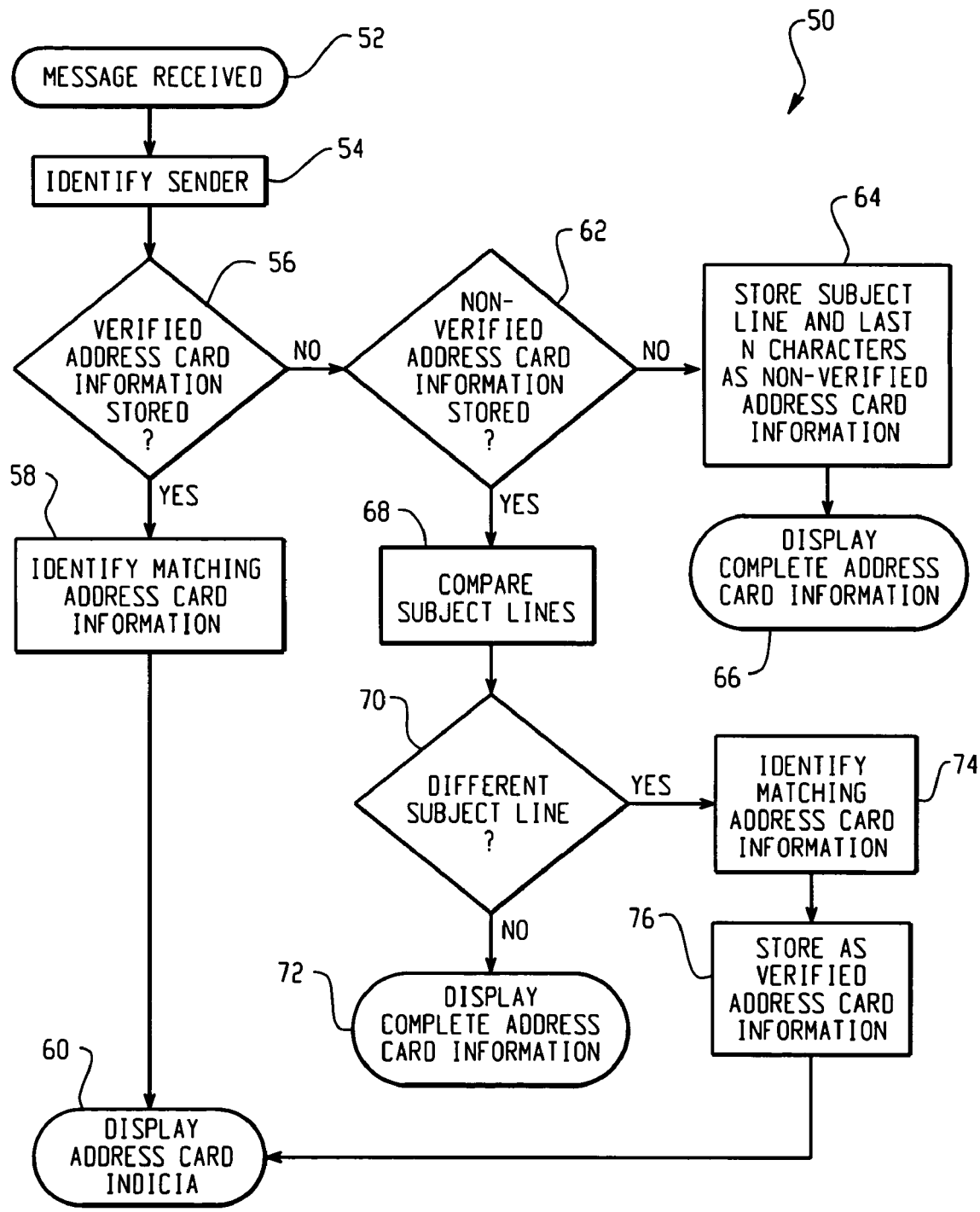
FIG. 4 is a flow diagram illustrating an example method for reducing the size of an electronic message displayed on a mobile communication device.

FIG. 4 is a flow diagram illustrating an example method 50 for reducing the size of an electronic message displayed on a mobile communication device. The method 50 begins at step 52 when an electronic message is received by the mobile communication device. At step 54, the received electronic message is processed to identify the sender. For instance, a sender may be identified from the sender field 12 shown in FIGS. 1–3.

Once the sender is identified, the method 50 accesses a memory location in the mobile communication device to determine if verified address card information has been stored for the identified sender. If verified address card information for the identified sender is located, then the method proceeds to step 58. At step 58, the electronic message is processed to locate address card information that matches the verified address card information. The electronic message is then displayed in step 60 with the matching address card information being represented by an address card indicia, as shown in FIG. 2.

If verified address card information has not previously been stored in the mobile communication device, then the method proceeds from step 56 to step 62. At step 62, the device memory is searched to determine if non-verified address card information has been stored for the identified sender. If non-verified address card information is located, then the method proceeds to step 68. Else, if non-verified address card information is not located, then the method proceeds to step 64.

At step 64, the subject field of the received message and a predetermined amount (N characters) of text from the message body is stored to a memory location as the non-verified address card information associated with the sender. For instance, the method 50 may store the last 1000 characters of the received message as the non-verified address card information for the sender, along with the subject field of the message. Because no stored address card information was located, however, the method 50 displays the entire received electronic message at step 66, including any address card information.

In other examples, different methods may be used to select non-verified address card information from the received electronic message. For instance, the received electronic message may be processed to locate message text matching the sender's name or a sub-string of the sender's electronic mail address found in the sender field. All of the information starting with the identified message text to the end of the received message may then be stored as the non-verified address card information. In other examples, the method may select message text to store as the non-verified address card information that includes a phone number, an electronic mail address and/or some other information that is typically included in address card information.

At step 68, the subject field of the received electronic message is compared to the stored non-verified address card information. If it is determined that the received electronic message includes the same subject field as stored with the non-verified address card information, then the method proceeds from step 70 to step 72 and the entire electronic message is displayed, including any address card information. If the received electronic message includes a different subject field than the non-verified address card information, however, then the method proceeds from step 70 to step 72 and locates address card information in the received message that matches information in the stored non-verified address card information. The matching address card information is then stored as verified address card information at step 76, and the electronic message is displayed at step 78 with the matching address card information being represented by an address card indicia, as shown in FIG. 2. In this manner, if the same information is included in two separate electronic messages (i.e., two electronic messages with different subject fields) that is received from the same sender, then this repeated information is verified as address card information and displayed as an address card indicia.

Figure 5:
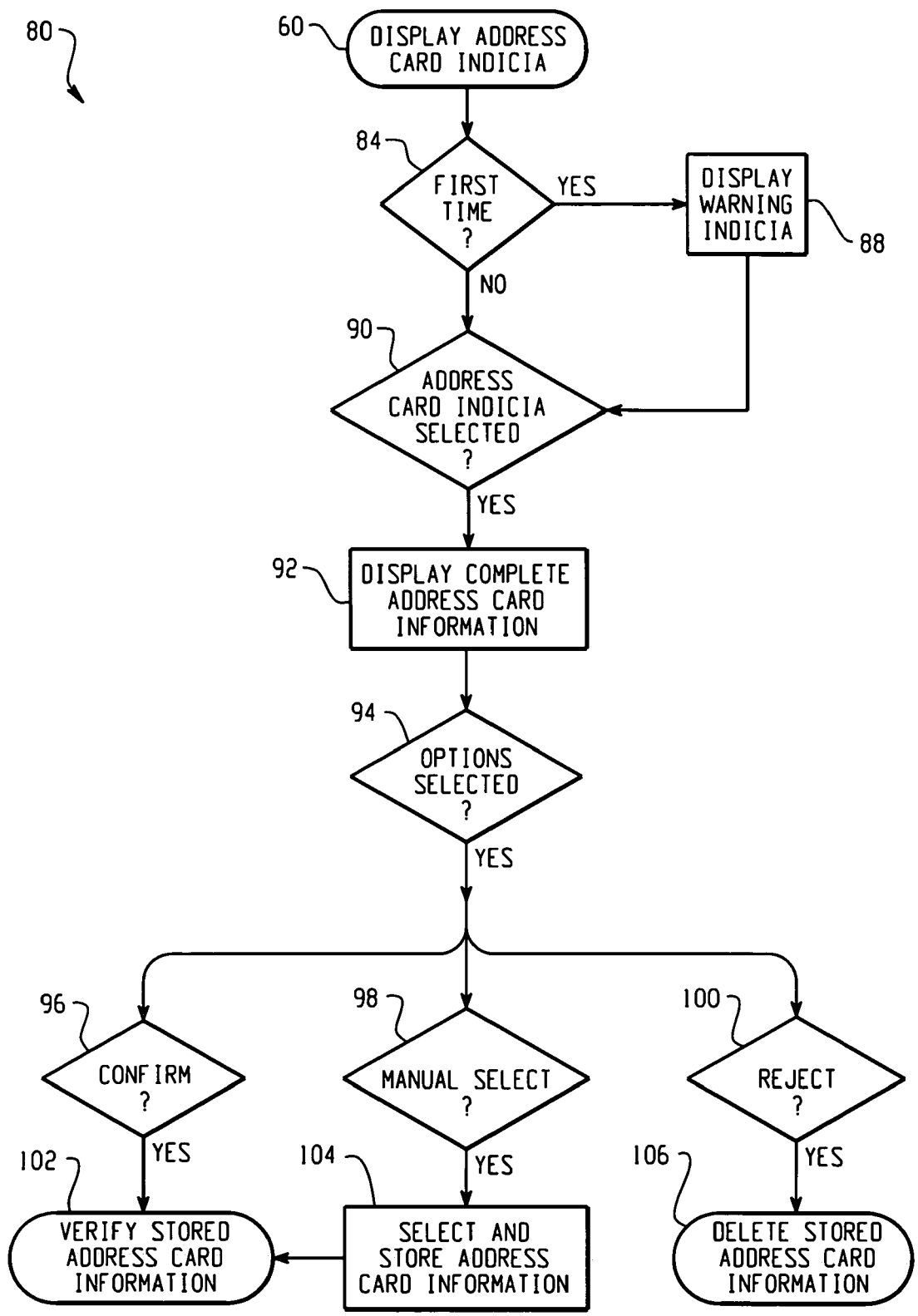
FIG. 5 is a flow diagram illustrating a continued example method for reducing the size of an electronic message displayed on a mobile communication device.

FIG. 5 is a flow diagram illustrating a continued example method 80 for reducing the size of an electronic message displayed on a mobile communication device. The method 80 illustrated in FIG. 5 begins at step 60 with the address card indicia being displayed on the mobile communication device. At step 84, the method determines whether this is the first time that address card information for the particular sender has been displayed in the form of an address card indicia. If so, then at step 88 a warning indicia is displayed along with the address card indicia. For example, with reference to FIG. 2, if it is the first time that the address card indicia 30, 32 is being displayed on the mobile communication device 10 for a message received from the sender (John Smith) then some additional warning indicia may also be included. For instance, an explanation point may be displayed, the address card indicia 30, 32 may be displayed in red, or some other warning indicia may be used to prompt the user to ensure that valid address card information 18 is represented by the address card indicia 30, 32.

At step 90, the method 80 waits for a user to select the address card indicia. If the address card indicia is selected, then the complete address card information is displayed, as illustrated in FIG. 3. While the address card information is being displayed, the user may also select an options menu at step 94. If the options menu is selected, then the user may choose to a) confirm that the displayed address card information is valid (step 96 and 102), b) manually select information from the received message to store as the verified address card information (steps 98, 102 and 104), or c) reject the address card indicia and delete the stored address card information (steps 100 and 106).

Figure 6:
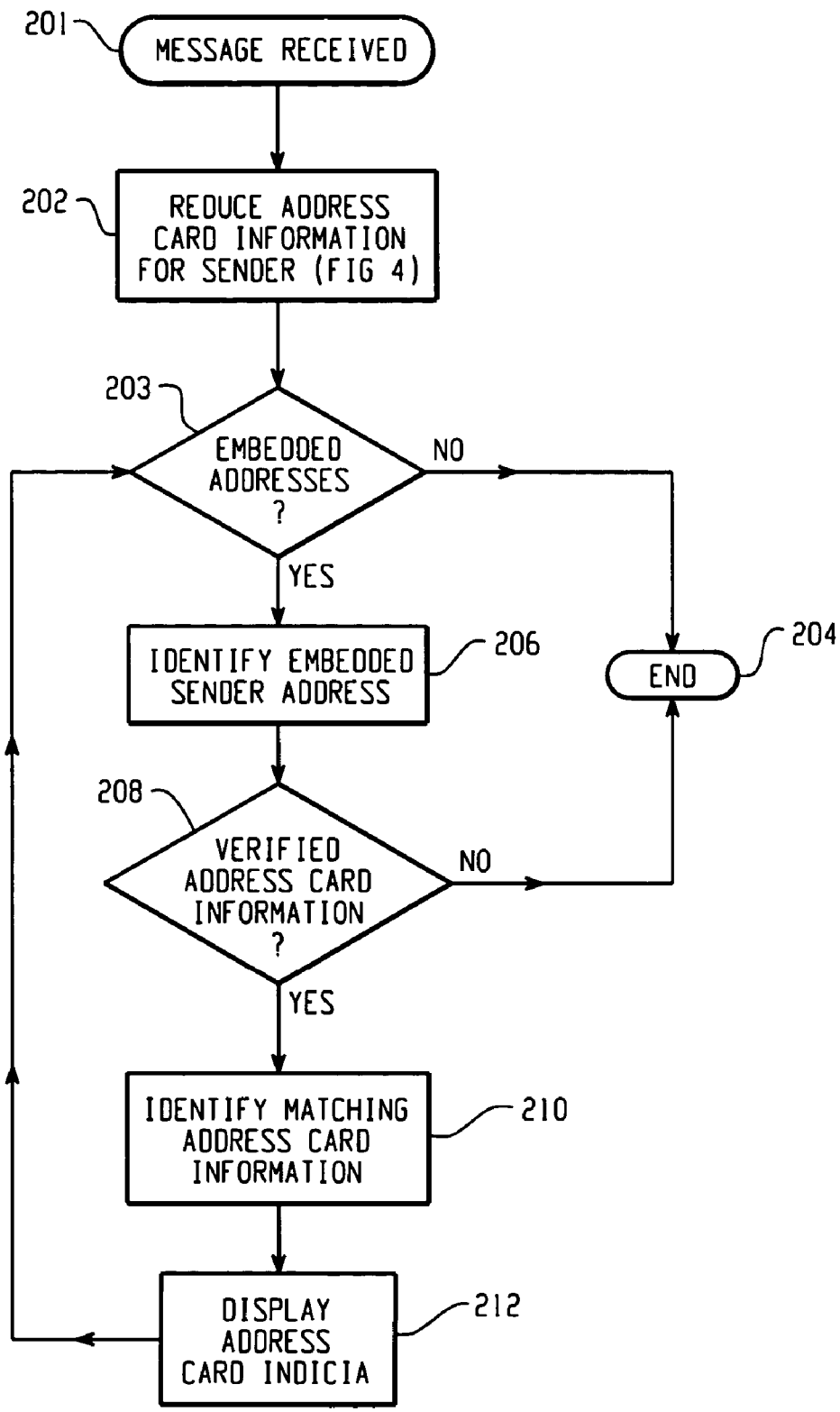
FIG. 6 is a flow diagram illustrating an example method for further reducing the size of an electronic message received on a mobile communication device.

FIG. 6 is a flow diagram illustrating an example method 200 for further reducing the size of an electronic message received on a mobile communication device. The method 200 begins at step 201 when an electronic message is received by the mobile communication device. At step 202, the received electronic message is processed (e.g., as described above with reference to FIG. 4) to locate address card information for the sender and to automatically display a reduced version of the electronic message on the mobile communication device by representing the address card information with an address card indicia.

At step 203, the electronic message is further processed to locate any address fields embedded within the electronic message. For example, if the electronic message is a reply or a forwarded message, then a previous electronic message may be embedded within the received electronic message. If no embedded address fields are located, then the method ends at step 204. Otherwise, if an embedded address field is located, then a sender address is identified from the embedded address information at step 206 and the method continues to step 208.

At step 208 the method determines if verified address card information has been stored for the identified sender address located in the embedded address field. If no verified address card information is located, then the method ends at step 204. Otherwise, if verified address card information is located, then the electronic message is processed at step 210 to match address card information in the received message with the verified address card information. Then, the matching address card information is displayed as an address card indicia at step 212, and the method returns to step 202 to locate any further embedded addresses.

Figure 7:
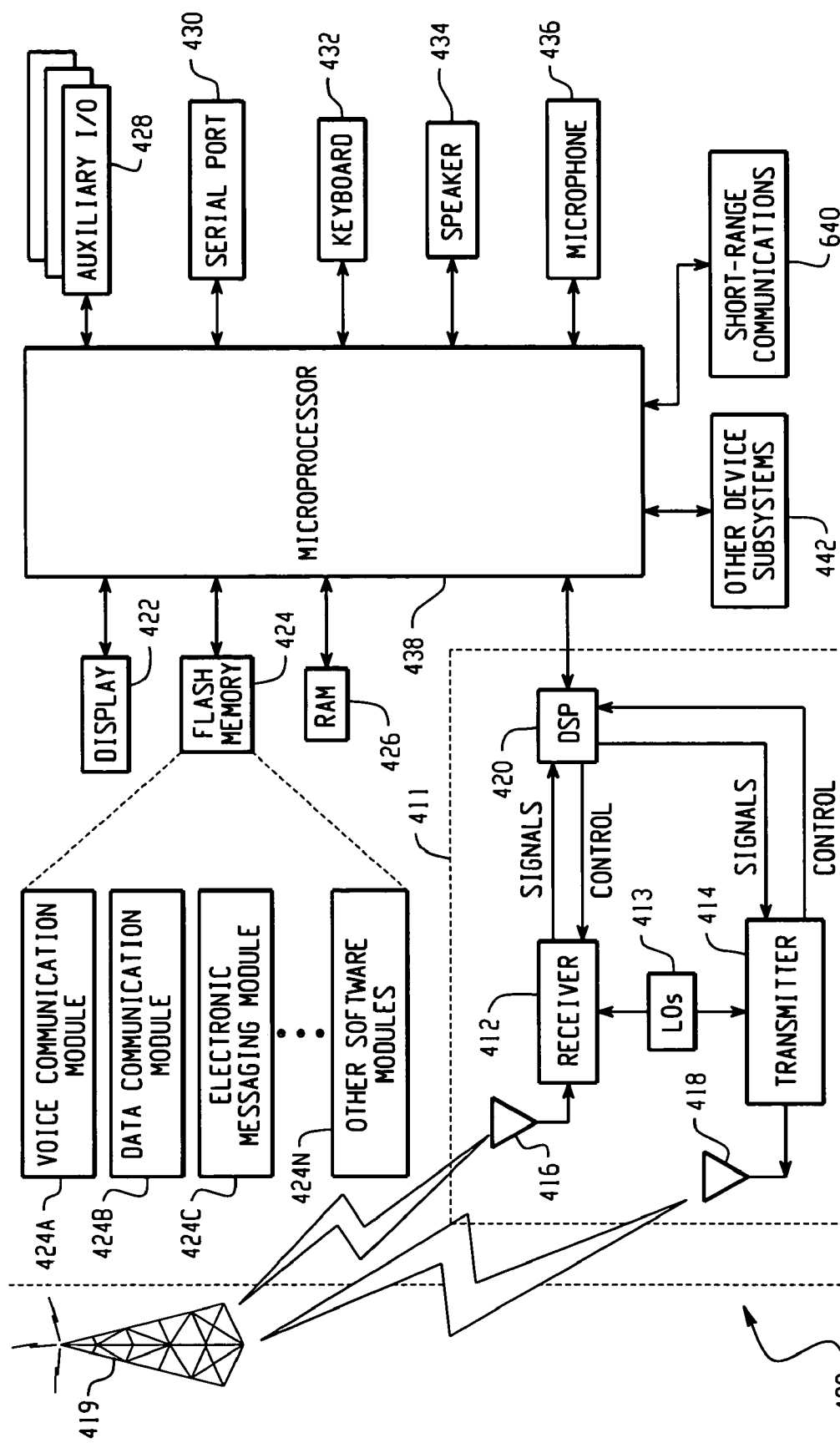
FIG. 7 is a block diagram illustrating an example mobile communication device.

FIG. 7 is a block diagram illustrating an example mobile communication device 400. The mobile communication device 400 includes a processing subsystem 438, a communications subsystem 411, a short-range communications subsystem 440, a memory subsystem 424, 426, and various other device subsystems and/or software modules 442. The mobile communication device 400 also includes a user interface, which may include a display 422, a keyboard 430, a speaker 432, a microphone 436, one or more auxiliary input/output devices 428, a serial port 430, and/or other user interface devices.

The processing subsystem 438 controls the overall operation of the mobile communication device 400. Operating system software executed by the processing subsystem 438 may be stored in a persistent store, such as a flash memory 424, but may also be stored in other types of memory devices in the memory subsystem, such as a read only memory (ROM) or similar storage element. In addition, system software, specific device applications, or parts thereof, may be temporarily loaded into a volatile store, such as a random access memory (RAM) 426. Communication signals received by the mobile communication device 400 may also be stored to RAM 426.

The processing subsystem 438, in addition to its operating system functions, enables execution of software applications 424 on the device 400. A predetermined set of applications that control basic device operations, such as data and voice communications, may be installed on the device 400 during manufacture. In addition, a personal information manager (PIM) application, including an electronic messaging application 424C, may be installed on the device. The PIM may, for example, be operable to organize and manage data items, such as e-mail, calendar events, voice mails, appointments, and task items. The PIM application may also be operable to send and receive data items via a wireless network 419. The electronic messaging software application 424C, whether part of or separate from a PIM application, may perform the functions described herein for reducing the size of an electronic message displayed on the device 400.

Communication functions, including data and voice communications, are performed through the communication subsystem 411, and possibly through the short-range communications subsystem 440. The communication subsystem 411 includes a receiver 412, a transmitter 414 and one or more antennas 416, 418. In addition, the communication subsystem 411 also includes a processing module, such as a digital signal processor (DSP) 420 or other processing device(s), and local oscillators (LOs) 413. The specific design and implementation of the communication subsystem 411 is dependent upon the communication network in which the mobile communication device 400 is intended to operate. For example, a mobile communication device 400 may include a communication subsystem 411 designed to operate within the Mobitex™ mobile communication system, the DataTAC™ mobile communication system, a GSM network, a GPRS network, a UMTS network, and/or an EDGE network.

Network access requirements vary depending upon the type of communication system. For example, in the Mobitex and DataTAC networks, mobile communication devices are registered on the network using a unique personal identification number or PIN associated with each device. In UMTS and GSM/GPRS networks, however, network access is associated with a subscriber or user of a device. A GPRS device therefore requires a subscriber identity module, commonly referred to as a SIM card, in order to operate on a GSM/GPRS network.

When required network registration or activation procedures have been completed, the mobile communication device 400 may send and receive communication signals over the communication network 419. Signals received by the antenna 416 from the communication network 419 are routed to the receiver 412, which provides signal amplification, frequency down conversion, filtering, channel selection, etc., and may also provide analog to digital conversion. Analog-to-digital conversion of the received signal allows the DSP to perform more complex communication functions, such as demodulation and decoding. In a similar manner, signals to be transmitted to the network 419 are processed (e.g., modulated and encoded) by the DSP 420 and are then provided to the transmitter 414 for digital to analog conversion, frequency up conversion, filtering, amplification and transmission to the communication network 419 (or networks) via the antenna 418.

In addition to processing communication signals, the DSP 420 provides for receiver 412 and transmitter 414 control. For example, gains applied to communication signals in the receiver 412 and transmitter 414 may be adaptively controlled through automatic gain control algorithms implemented in the DSP 420.

In a data communication mode, a received signal, such as a text message or web page download, is processed by the communication subsystem 411 and input to the processing device 438. The received signal is then further processed by the processing device 438 for output to a display 422, or alternatively to some other auxiliary I/O device 428. A device user may also compose data items, such as e-mail messages, using a keyboard 438 and/or some other auxiliary I/O device 428, such as a touchpad, a rocker switch, a thumb-wheel, or some other type of input device. The composed data items may then be transmitted over the communication network 419 via the communication subsystem 411.

In a voice communication mode, overall operation of the device is substantially similar to the data communication mode, except that received signals are output to a speaker 434, and signals for transmission are generated by a microphone 436. Alternative voice or audio I/O subsystems, such as a voice message recording subsystem, may also be implemented on the device 400. In addition, the display 422 may also be utilized in voice communication mode, for example to display the identity of a calling party, the duration of a voice call, or other voice call related information.

The short-range communications subsystem 440 enables communication between the mobile communication device 400 and other proximate systems or devices, which need not necessarily be similar devices. For example, the short-range communications subsystem 440 may include an infrared device and associated circuits and components, or a Bluetooth™ communication module to provide for communication with similarly-enabled systems and devices.

Figure 8:
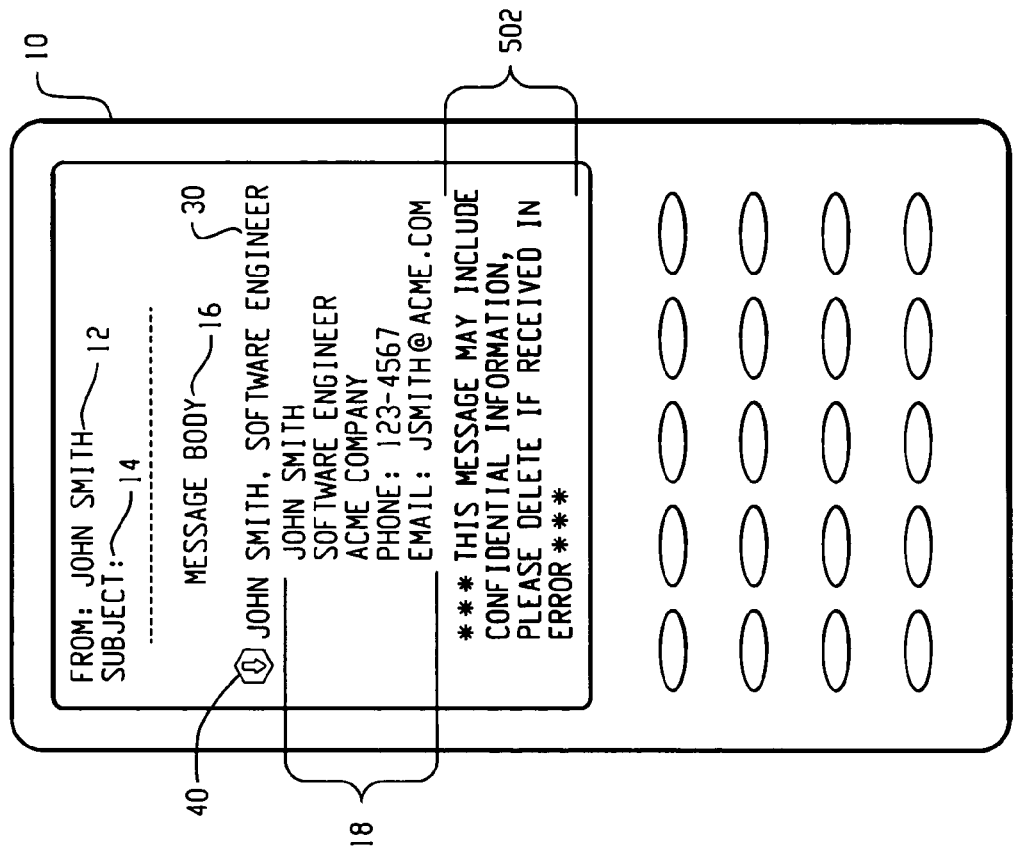
FIG. 8 shows a mobile communication device displaying an electronic message in which additional information is represented by the address card indicia.

This written description uses examples to disclose the invention, including the best mode, and also to enable a person skilled in the art to make and use the invention. The patentable scope of the invention may include other examples that occur to those skilled in the art. For example, as shown in FIG. 8, an indicia displayed with an electronic message may represent repetitive information other than or in addition to address card information. That is, any type of information that is repetitively appended to electronic messages may be represented by some indicia (e.g., an address card indicia) in the displayed message. In the example of FIG. 8, an address card indicia 30, 40 is shown that represents repetitive information 502 in addition to the address card information 18. In particular, the example of FIG. 8 shows a confidentiality warning 502 that has been appended to the received message from the sender, John Smith. In one further example, address card information to be represented by an address card indicia in a displayed message may be identified by including some type of hidden tag (e.g., an HTML tag) in the electronic message which denotes the beginning and end of the address card information.

The invention claimed is:

1. A method of reducing the size of an electronic message displayed on a mobile communication device, comprising:
   receiving the electronic message with the mobile communication device, the electronic message including address card information;
   identifying the address card information in the electronic message; and
   automatically displaying a reduced version of the electronic message on the mobile communication device, by replacing the address card information with an address card indicia.

2. The method of claim 1, further comprising:
   displaying the address card information on the mobile communication device in response to the address card indicia being selected through a user interface.

3. The method of claim 1, wherein the address card indicia includes a portion of the address card information.

4. The method of claim 1, wherein the address card indicia includes a graphical icon.

5. The method of claim 2, wherein in response to the address card indicia being selected through the user interface, the address card indicia is modified to indicate that the address card information is displayed.

6. The method of claim 1, wherein the address card information is identified by comparing the electronic message with a previously received electronic message having a common sender field.

7. The method of claim 1, wherein the address card information is identified by comparing the electronic message with stored address card information.

8. The method of claim 1, wherein the address card information is identified by locating hidden tags included in the received electronic message that identify a beginning and an end of the address card information.

9. The method of claim 1, further comprising:
   displaying a warning indicia to prompt a user to verify that the address card indicia represents valid address card information.

10. The method of claim 1, wherein in the step of identifying the address card information in the electronic message, the address card information is identified in the body of the electronic message.

11. A method of reducing the size of an electronic message displayed on a mobile communication device, comprising:
   receiving a first electronic message from a sender;
   selecting a portion of the first electronic message that is likely to be repeated in subsequent electronic messages from the sender;
   receiving a second electronic message from the sender;
   determining if the first electronic message and the second electronic message include a common subject field;
   if the first electronic message and the second electronic message do not include a common subject field, then comparing the selected portion of the first electronic message with the second electronic message to identify repeated information, and displaying a reduced version of the second electronic message on the mobile communication device by replacing the repeated information with an indicia;
   else if the first electronic message and the second electronic message do include a common subject field, then displaying a complete version of the second electronic message.

12. The method of claim 11, wherein the mobile communication device includes a user interface that may be used to select the indicia, further comprising:
   in response to the indicia being selected, displaying the repeated information on the mobile communication device.

13. The method of claim 11, further comprising:
   storing the repeated information to a memory location;
   receiving a third electronic message from the sender;
   identifying the repeated information in the third electronic message by comparing the third electronic message with the stored repeated information; and
   displaying a reduced version of the third electronic message on the mobile communication device, wherein the repeated information is represented by the indicia.

14. The method of claim 11, wherein the repeated information includes address card information.

15. The method of claim 14, wherein the indicia includes a portion of the address card information.

16. The method of claim 14, wherein the indicia includes a graphical icon.

17. The method of claim 11, further comprising:
   receiving a user input verifying that the repeated information is address card information.

18. The method of claim 11, further comprising:
   receiving a user input rejecting the indicia; and
   displaying a complete version of the electronic message, wherein the complete version of the electronic message includes the repeated information.

19. The method of claim 11, further comprising:
   receiving a user input to select address card information in the second electronic message; and
   displaying a verified reduced version of the second electronic message on the mobile communication device, wherein the selected address card information is represented by an address card indicia.

20. The method of claim 11, wherein in the step of selecting a portion of the first electronic message that is likely to be repeated in subsequent electronic messages from the sender, the portion of the first electronic message that is likely to be repeated is selected from the body of the electronic message.

21. A mobile communication device, comprising:
   a communication subsystem operable to send and receive electronic messages over a communication network;
   memory subsystem operable to store data and program information;
   a processing subsystem operable to store and retrieve data in the memory subsystem, execute programs stored in the memory subprogram, and cause the communication subsystem to transmit and receive electronic messages over the communication network;

a user interface operable to display information; and an electronic messaging software application stored in the memory subsystem and when executed by the processing subsystem being operable to receive an electronic message via the communication subsystem, identify address card information in the electronic message, and automatically display a reduced version of the electronic message on the user interface, by replacing the address card information with an address card indicia in the reduced version of the electronic message.

22. The mobile communication device of claim 21, wherein the address card information is identified in the body of the electronic message.

* * * * *

UNITED STATES PATENT AND TRADEMARK OFFICE
CERTIFICATE OF CORRECTION

PATENT NO. : 7,164,937 B2 Page 1 of 1
APPLICATION NO. : 10/700979
DATED : January 16, 2007
INVENTOR(S) : Schnurr It is certified that error appears in the above-identified patent and that said Letters Patent is hereby corrected as shown below:

Column 8, line 64, insert -- a -- before "memory"

Signed and Sealed this

Twenty-fifth Day of March, 2008

JON W. DUDAS
*Director of the United States Patent and Trademark Office*